W. B. FEATHERSTONE.
PROJECTING MACHINE.
APPLICATION FILED MAY 10, 1912.
1,167,643.
Patented Jan. 11, 1916.
2 SHEETS—SHEET 1.
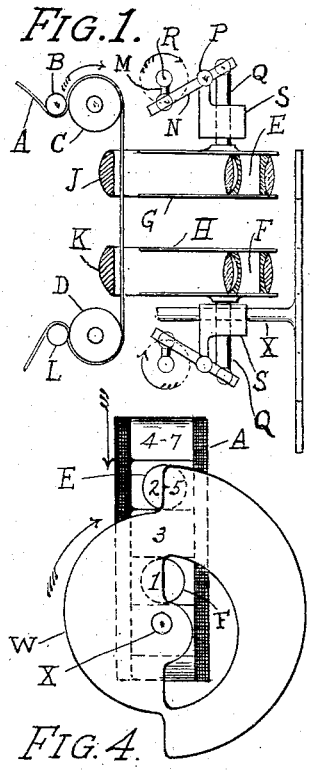
FIG. 1.
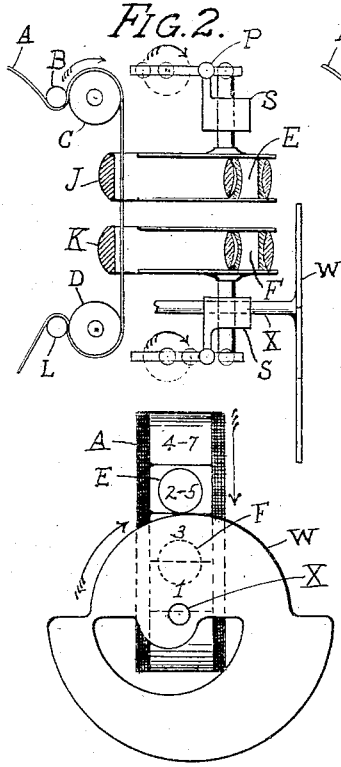
FIG. 2.
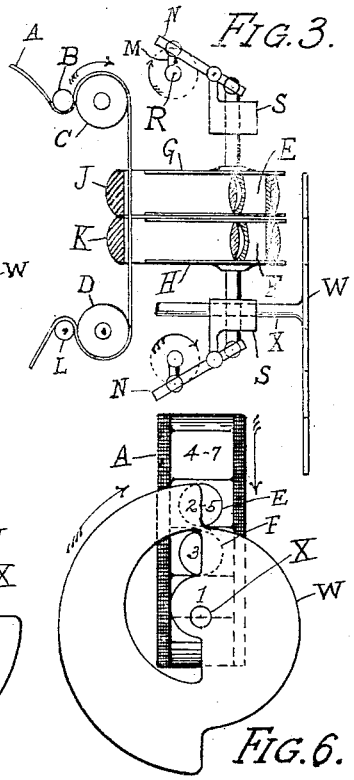
FIG. 3.
FIG. 4.    FIG. 5.    FIG. 6.
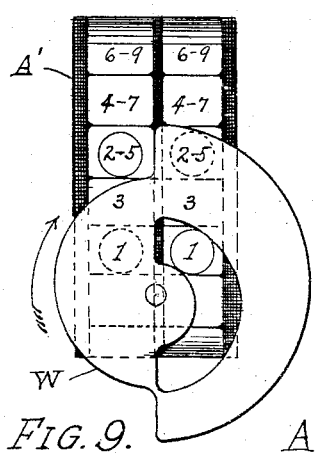
FIG. 9.
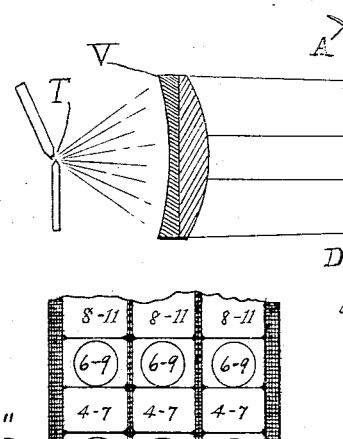
FIG. 7.
FIG. 8.
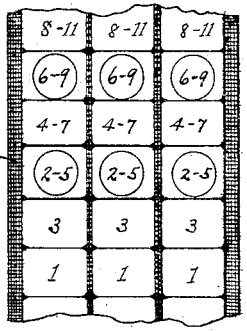
FIG. 10.
WITNESSES:
Harold J. Petrie.
Albert S. Kux
INVENTOR:
Willard B. Featherstone

W. B. FEATHERSTONE.
PROJECTING MACHINE.
APPLICATION FILED MAY 10, 1912.

1,167,643.

Patented Jan. 11, 1916.
2 SHEETS—SHEET 2.

WITNESSES:

INVENTOR:
Willard B. Featherstone

UNITED STATES PATENT OFFICE.

WILLARD B. FEATHERSTONE, OF WASHINGTON, DISTRICT OF COLUMBIA.

PROJECTING-MACHINE.

1,167,643.      Specification of Letters Patent.      Patented Jan. 11, 1916.

Application filed May 10, 1912. Serial No. 696,423.

*To all whom it may concern:*

Be it known that I, WILLARD B. FEATHERSTONE, a citizen of the United States, residing at Washington, in the District of Columbia, have invented a new and useful Projecting-Machine, of which the following is a specification.

My invention relates to the successive projection of one or more series of images, usually photographic, and has for its object to provide a continuous series of projected images, instead of the intermittent projections of the ordinary cinematograph.

I accomplish this by means of the mechanism and optical arrangement shown in the accompanying drawings, in which—

Figure 11:
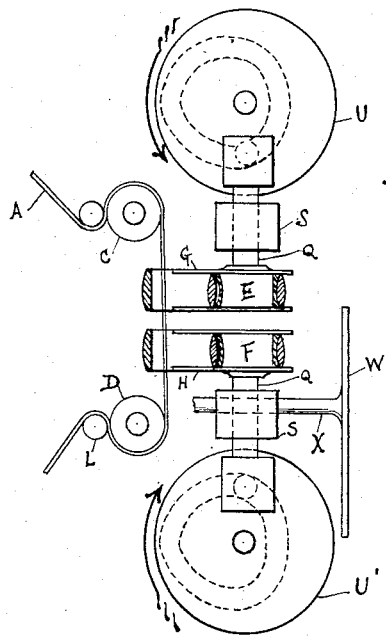
Figure 12:
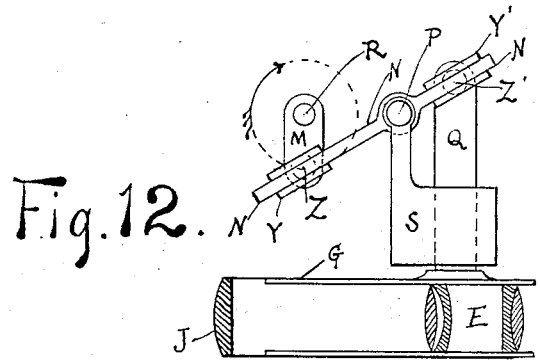

Figure 1 is a side view of a portion of the mechanism showing the lenses in section. Figs. 2 and 3 are similar views showing the lenses in different positions. Figs. 4, 5 and 6 are partial front views corresponding with Figs. 1, 2 and 3, respectively. Fig. 7 is similar to Fig. 1, but shows more of the optical arrangement. Fig. 8 is a top view, in section, of an objective and one unit of the condenser. Fig. 9 is a partial front view of a mechanism for use with double series film and two pairs of objectives. Fig. 10 shows a three series film and indicates the use of two sets of three objectives each. Fig. 11 is the same as Fig. 2, except that it shows the use of cams in the mechanism. Fig. 12 is an enlarged view of part of the mechanism in Fig. 1.

Similar letters refer to similar parts, and the numerals indicate the order in which the film images are exposed.

In the several figures, A is an ordinary cinematographic film, having upon it a series of positive photographic images, representing successive phases of an object or scene. This film is passed through my new mechanim by means of the continuously revolving rollers D and L, and it is not necessary that D be provided with sprockets, although this may of course be done for use with perforated films.

B and C are idle rollers to guide the film, in its downward passage between the condensers J, K, and the objectives E, F, which are mounted in the tubes G, H, which also carry the partial condensers J, K. These tubes G, H, with their lenses, reciprocate vertically and alternately, having fixed to them the rods Q, Q, which are guided by the stationary blocks S, S, fixed to the frame of the mechanism.

P, Fig. 1, is pivotally mounted in S, and is the fulcrum of the lever N, which is operated by the crank M, which turns about the center R. The upper crank in its revolution causes the lever to reciprocate the upper lens tube, and the lower crank and lever perform a similar function for the lower lens tube.

Y, Y', Fig. 12, are guiding blocks for the lever N to slide in as it tilts about the center P, and these blocks rotate about the pivots Z, and Z', respectively.

W is a shutter whose shaft X, is journaled in the block S, fixed to the frame. The several parts revolve and move in the directions indicated by the arrows.

In Fig. 1, the objectives E and F, are separated from each other by slightly less than the height of two film images, so that the images 1 and 2—5, Fig. 4, will be projected in precise register upon the screen. The shutter W, is just beginning the exposure of image 2—5, and beginning to occult the image 1, Fig. 4.

In Fig. 2 and Fig. 5, the objectives E. F have moved closer together by nearly half the height of an image, since the objective E, has followed the film A, in its downward travel to the extent of nearly one-fourth the height of an image, and the objective F, has risen to the same extent. The separation of the objectives and the extent of their travel are determined by their distance from the screen. The shutter W, has meanwhile revolved to the position shown in Fig. 5, fully exposing the image 2—5 and occulting the image 1. This condition obtains until the lenses have reached the positions shown in Figs. 3 and 6, when the shutter begins to occult the image 2—5 and to expose the image 3. The objective F, now begins its downward travel and projects the image 3, on the screen during half a revolution, while the objective E, is rising to the position shown in Figs. 1 and 4, whereupon the shutter exposes the image 4—7, to be followed in another half revolution by the exposure of image 2—5 through objective F.

In order to produce the most perfect results on the screen, it is well to modify the usual method of condensing the light from the radiant T, Fig. 7. I therefore employ an achromatic condenser V, to render the rays parallel or slightly convergent, and then pass them through other condensers J, K, which may reciprocate with the objectives E, F, thus providing a pair of condensed beams whose axes will approximately coincide with the optic axes of the objectives. The reciprocation of these small condensers may be accomplished by any convenient means, or they may be mounted in the tubes G and H, as shown in Fig. 8.

In Fig. 9 is shown a double film for use with a mechanism similar to that shown in the preceding figures, but having four objectives reciprocating in pairs. In Fig. 10, a triple film is shown for use with two sets of three objectives each. When the wider films are employed it is only necessary to widen proportionately the parts of the mechanism engaged in feeding the film, and to provide the usual means for lateral register. No additional mechanism is occasioned by the duplication of the objectives as each set of two or three objectives moves as a unit.

In regard to the means employed to reciprocate the objectives, this is best done either by cams, U, U', Fig. 11, having uniform rise during one-half of a revolution, or by a specially designed eccentric movement, such as the crank and lever roughly indicated in the drawing, Figs. 1, 2, 3, and 12, although I do not limit the scope of my invention to any specific means, as the desired alternate reciprocation may be attained by various means.

To provide a sufficiently uniform motion of the objective during the direct stroke, when using the crank and lever mechanism shown in Figs. 1, and 12, the distance from R to P should be about 1.73 times the distance from R to Z (Fig. 12). The actual dimensions of the crank and the lever arms are proportioned to give the required direct movement to the objective, which is slightly less than one-half the height of an image, depending upon the distance from the screen, and the focus of the objective.

It is unnecessary to run my new mechanism as rapidly as the ordinary cinematograph, for since the projection is continuous, it is not necessary to rely upon the principle of "persistence of vision" which depends for effect upon the rapidity of projection. In fact the speed need only be sufficient to blend successive phases of the scene, and may be indefinitely slow.

I claim:

1. In an optical projection device, of the continuously moving picture-surface type, a pair of objectives adapted to reciprocate alternately, and substantially in the same plane and means to cause the direct travel of the objectives to be slightly less than that of the picture surface.

2. In an optical projection device, of the continuously moving picture-surface type, a pair of objectives means to reciprocate the objectives alternately, and substantially in the same plane, and a shutter adapted to expose the objectives in the order of their reciprocation.

3. In an optical projection device, the combination with a pair of similar objectives, of means to reciprocate the objectives alternately and substantially perpendicularly to their optic axes, and substantially in the same plane, and means to move a series of images continuously across the said axes, and at a rate so proportioned to that of the direct movement of the objectives that the axis of each shall intersect continuously a given point in a moving image, and a stationary point in the corresponding projected image throughout substantially the entire exposure period.

4. In an optical projection device, of the continuously moving picture-surface type, the combination with a reciprocating objective and a stationary condensing element, of another and smaller condensing element adapted to reciprocate with the objective.

5. In an optical projection device, of the continuously moving picture-surface type, a plurality of reciprocating objectives and a plurality of condensing elements adapted to reciprocate with the objectives.

6. In an optical projection device, of the continuously moving picture-surface type, having a principal condensing element which is stationary, and an objective whose axis reciprocates periodically, a secondary condensing element whose axis is adapted to move with the axis of the objective.

7. In an optical projection device of the continuously moving picture-surface type, two sets of objectives, means to cause each set to move with the film and then return, the corresponding objectives of each set moving substantially in the same plane.

WILLARD B. FEATHERSTONE.

In presence of—
HAROLD J. PETRIE,
R. B. SWOPE.

Copies of this patent may be obtained for five cents each, by addressing the "Commissioner of Patents, Washington, D. C."